US012118965B2

(12) United States Patent
Lewis et al.

(10) Patent No.: US 12,118,965 B2
(45) Date of Patent: Oct. 15, 2024

(54) ACOUSTIC RESONANCE DEVICE

(71) Applicants: The Order Fulfillment Group Inc., Zionsville, IN (US); Grover Musical Products, Inc., Cleveland, OH (US)

(72) Inventors: Edward D Lewis, Brownsburg, IN (US); Cory M Berger, Cleveland, OH (US)

(73) Assignees: The Order Fulfillment Group Inc., Zionsville, IN (US); Grover Musical Products, Inc., Cleveland, OH (US)

( * ) Notice: Subject to any disclaimer, the term of this patent is extended or adjusted under 35 U.S.C. 154(b) by 317 days.

(21) Appl. No.: 17/830,289

(22) Filed: Jun. 1, 2022

(65) Prior Publication Data
US 2023/0395044 A1    Dec. 7, 2023

(51) Int. Cl.
  *G10D 13/10*    (2020.01)
  *F21V 23/04*    (2006.01)
  *F21V 33/00*    (2006.01)
  *F21Y 115/10*   (2016.01)
  *G01H 11/08*    (2006.01)
(52) U.S. Cl.
  CPC ......... *G10D 13/10* (2020.02); *F21V 23/0492* (2013.01); *F21V 33/0056* (2013.01); *G01H 11/08* (2013.01); *F21Y 2115/10* (2016.08)
(58) Field of Classification Search
  None
  See application file for complete search history.

(56) References Cited

U.S. PATENT DOCUMENTS

| | | | |
|---|---|---|---|
| 1,828,660 A | 10/1931 | Homer et al. | |
| 4,187,635 A | 2/1980 | Deissler | |
| 4,741,242 A * | 5/1988 | Aronstein | G10G 7/02 |
| | | | 984/260 |
| 5,823,844 A | 10/1998 | Markowitz | |
| 7,777,109 B2 | 8/2010 | Saragosa | |
| 11,282,484 B1 | 3/2022 | Lewis et al. | |
| 2002/0117041 A1 | 8/2002 | Elliot | |

(Continued)

FOREIGN PATENT DOCUMENTS

CN    207074522 U  *  3/2018

OTHER PUBLICATIONS

Ma J, "Two-dimensional Standing Wave Resonance Demonstration Instrument", Mar. 6, 2018, Image document of CN 207074522 U merged with English translation text, 7 pages image document then translation text. (Year: 2018).*

(Continued)

*Primary Examiner* — Alan B Cariaso

(57) ABSTRACT

An acoustic resonance device is provided including a cylindrical body, a tympanic cover, a vibration element, a lighting element, and a sensor. The cylindrical body includes an inner surface which defines a chamber. The chamber extends from a first end to a second end. The first end of the chamber is uncovered. The tympanic cover is coupled to the second end of the cylindrical body. The vibration element includes a first end and a second end. The first end of the vibration element is coupled to the tympanic cover. The lighting element is arranged within the chamber of the cylindrical body. The sensor is electrically coupled to the lighting element and is adapted to control the lighting element.

20 Claims, 5 Drawing Sheets

(56) References Cited

U.S. PATENT DOCUMENTS

2014/0049939 A1*  2/2014  Kuenzler ................ F21V 5/045
                                                    362/307
2017/0178612 A1   6/2017  Truchsess
2018/0233118 A1*  8/2018  Van Den Broeck ..... G10G 7/02
2018/0245787 A1*  8/2018  Zhuang ................ F21V 19/003

OTHER PUBLICATIONS

Bai Ling Electronics Co., Ltd., SW-18015P/20p Product Details Specification, Feb. 18, 2011, Suwu Industrial Zone, Bajiaowo Village, Wangjiang District, Dongguang, Guangdong, China.

* cited by examiner

ACOUSTIC RESONANCE DEVICE

TECHNICAL FIELD

This disclosure relates to accessories related to acoustic resonance devices and, in particular, to acoustic resonant amplification tubes such as thunder tubes and spring drums.

BACKGROUND

The statements in this section merely provide background information related to the present disclosure and may not constitute prior art.

A variety of acoustic resonant amplification devices exist, such as thunder tubes and spring drums. In some situations, it is desirable to illuminate the acoustic device to create a visual effect. However, coordination of illumination with movement of the device can be difficult to achieve. Therefore, an acoustic resonance device which coordinates illumination effects with the movement of the device is desirable.

SUMMARY

Further areas of applicability will become apparent from the description provided herein. It should be understood that the description and specific examples are intended for purposes of illustration only and are not intended to limit the scope of the present disclosure.

In one embodiment, an acoustic resonance device is provided including a cylindrical body, a tympanic cover, a vibration element, a lighting element, and a sensor. The cylindrical body includes an inner surface which defines a chamber. The chamber extends from a first end to a second end. The first end of the chamber is uncovered. The tympanic cover is coupled to the second end of the cylindrical body. The vibration element includes a first end and a second end. The first end of the vibration element is coupled to the tympanic cover. The lighting element is arranged within the chamber of the cylindrical body. The sensor is electrically coupled to the lighting element and is adapted to control the lighting element.

In another embodiment, an acoustic resonance device is provided including a cylindrical body, a tympanic cover, a spring, a light-emitting diode, and a sensor. The cylindrical body includes an inner surface defining a chamber extending from a first end to a second end of the cylindrical body. The first end of the cylindrical body is uncovered. The tympanic cover is coupled to the second end of the cylindrical body. The spring is coupled to the tympanic cover. The light-emitting diode is coupled to the inner surface of the cylindrical body. The sensor is electrically coupled to the lighting element and is adapted to control the lighting element.

In yet another embodiment, a method of manufacturing an acoustic resonance device is provided including providing a cylindrical body, a tympanic cover, and a vibration element, positioning a lighting element within the chamber, and electrically coupling a sensor to the lighting element. The cylindrical body includes an inner surface defining a chamber extending from a first end to a second end of the cylindrical body. The first end of the cylindrical body is uncovered. The second end of the cylindrical body is coupled to the tympanic cover. The vibration element includes a first and a second end. The first end of the vibration element is coupled to the tympanic cover. The sensor is configured to control the lighting element.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In one example, an acoustic resonance device is provided including a cylindrical body, a tympanic cover, a vibration element, a lighting element, and a sensor. The cylindrical body includes an inner surface which defines a chamber. The chamber extends from a first end to a second end. The first end of the chamber is uncovered. The tympanic cover is coupled to the second end of the cylindrical body. The vibration element includes a first end and a second end. The first end of the vibration element is coupled to the tympanic cover. The lighting element is arranged within the chamber of the cylindrical body. The sensor is electrically coupled to the lighting element and is adapted to control the lighting element.

One technical advantage of the systems and methods described below may be that the acoustic resonance device may produce a dynamic lighting effect which is coordinated with the movement of device.

Figure 1:
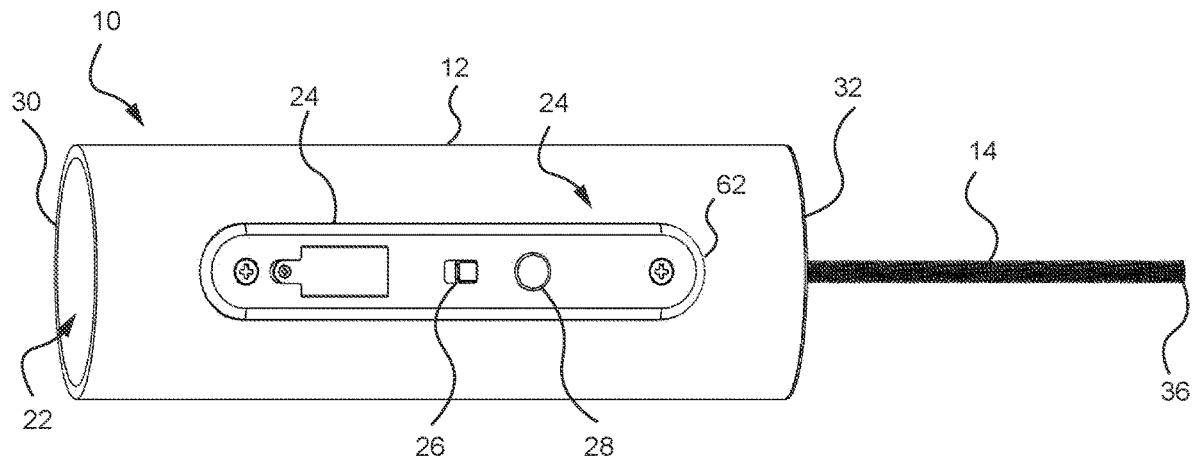
FIG. 1 illustrates a perspective view of an example of an acoustic resonance device including a cylindrical body and a vibration element.

FIG. 1 illustrates a perspective view of an example of an acoustic resonance device 10. The acoustic resonance device 10 may be any device which amplifies vibration through resonance to create an audible sound. Examples of the acoustic resonance device 10 may include a spring drum or a thunder tube. The acoustic resonance device may include a body 12, a tympanic cover (16 in FIG. 2), and a vibration element 14. The vibration element 14 may be any component which is capable of sustaining an induced vibration. Examples of the vibration element 14 may include a spring or a tensioned metallic filament. The tympanic cover 16 may be any component which may be coupled to the vibration element 14 and the body 12 to transfer the vibration of the vibration element 14 to the body 12. Examples of the tympanic cover 16 may include a skin or a panel. The tympanic cover 16 may be made of a material conducive for transmitting vibrations from the vibration element 14 to the body 12, such as rubber, metal, or plastic.

The vibration element 14 may have a first end (34 in FIG. 2) which is coupled to the tympanic cover 16 and a second end 36. The second end 36 of the vibration element 14 may be unrestrained or may be coupled to another object to tension the vibration element 14.

The body 12 may be any component which is capable of receiving vibrations from the tympanic cover 16 and amplifying the vibrations into audible sounds. Examples of the body 12 may include a cylindrical tube, a tapered cone, or other rounded shapes. The body 12 may be made of any material capable of amplifying the vibration of the tympanic cover 16, such as plastic, cardboard, or metal. The body 12 may include an inner surface (38 in FIG. 2) which defines a chamber 22. The chamber 22 may be any region of the acoustic resonance device 10 which is at least partially enclosed by the body 12 and the tympanic cover 16. The chamber 22 may be large enough to amplify sound waves from the vibration element 14 and the tympanic cover 16. The body 12 may extend from a first end 30 to a second end 32. The tympanic cover 16 may be coupled to the body 12 at the second end 32. The first end 30 of the body 12 may be uncovered to allow amplified sound waves emanating from the chamber 22 to exit the acoustic resonance device 10.

In some embodiments, at least a portion of the body 12 may be transparent or translucent, such that when the lighting element 18 is activated, the illumination of the chamber 22 may be visible through the body 12. Similarly, the tympanic cover 16 may also be transparent or translucent to achieve a similar lighting effect. Additionally, the inner surface 38 of the body 12 may be transparent or translucent, and may also include light reflecting or light absorbing portions to create specifically desired lighting effects. For example, light-absorbing portions of the inner surface 38 may be arranged in the shape of a logo or image such that, when the body 12 is illuminated, the image or logo will be readily visible as darkened portions in contrast to illuminated portions of the body 12.

In some embodiments, a go-bo (go between) may be incorporated into the inner surface 38. For example, words or a logo may be etched to the inner surface 38. This image may be seen from outside the chamber 22 when the lighting element 18 is activated. Alternatively, the go-bo may be arranged anywhere within the chamber 22 where it will interact with light from the lighting element 18. For example, the go-bo may be etched into an inner surface 38 of the body 12.

The body 12 may also include a wall (40 in FIG. 2) which defines the inner surface 38. The wall 40 may have a thickness which may be important to the amplification of the sound waves within the chamber 22. For example, in an example of a wall 40 made from plastic, the thickness of the wall 40 may be between 0.05 inches and 10.00 inches, but preferably between 0.05 inches and inches to ensure adequate amplification of the sound waves within the chamber.

Figure 2:
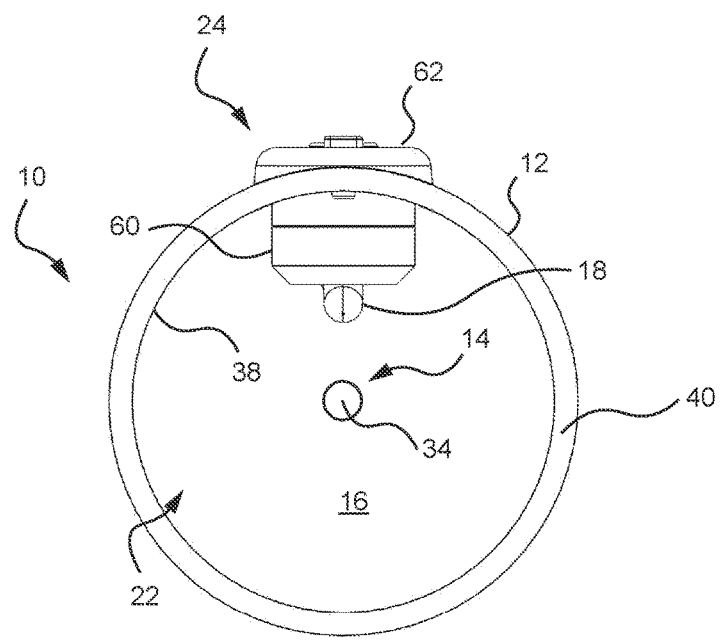
FIG. 2 illustrates a front plan view of a second example of the acoustic resonance device including the cylindrical body, and a hollow chamber.

A control module 24 may be coupled to the wall 40 to operate a sensor (20 in FIG. 3) and a lighting element (18 in FIG. 2). The control module 24 may include an inner portion (60 in FIG. 2) extending from the inner surface 38 into the chamber 22 and an outer portion 62 extending from the wall 40 outward and away from the chamber 22. The control module 24 may be any component of the device 10 which allows for operation of the device. The outer portion 62 of the control module 24 may be any portion of the device 10 which is accessible by a user to operate the device 10. For example, the outer portion 62 may include an on/off switch 26 which allows a user to power the sensor 20 and the lighting element 18. The outer portion 62 may also include a mode switch 28 which may be used to change the way in which the sensor 20 or lighting element 18 operate. For example, the mode switch 28 may be used to change the color of the lighting element 18 or to adjust the timing or intensity of the lighting element 18.

FIG. 2 illustrates a front plan view of an example of the acoustic resonance device 10. As illustrated, the first end 34 of the vibration element 14 may be coupled to the tympanic cover 16 at or near the second end of the body 12. The vibration element 14 may be coupled to the tympanic cover 16 at the center of the tympanic cover to allow even propagation of the sound waves from the vibration element 14 to the tympanic cover 16 and into the chamber 22. Alternatively, the vibration element 14 may be coupled to tympanic cover 16 at a point offset from the center of the tympanic cover 16 in order to produce a different acoustic effect.

The lighting element 18 may be any component which emits light into the chamber 22. Examples of the lighting element 18 may include a light-emitting diode, an incandescent bulb, or a fluorescent light. As illustrated in FIG. 2, the lighting element 18 may be partially positioned within the inner portion 60 of the control module 24 and may be directed to project light into the chamber 22.

Figure 3:
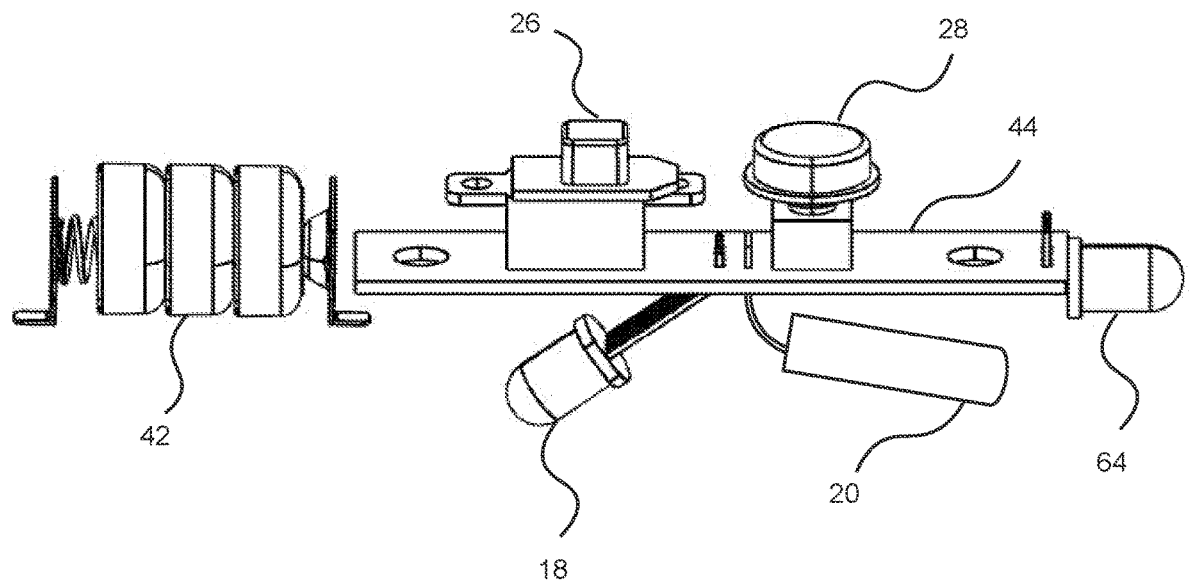
FIG. 3 illustrates a perspective view of an example of a control module for an acoustic resonance device including an electrical source, a lighting element, and a sensor.

FIG. 3 illustrates an example of the interior components of the control module 24. The control module 24 may include a control board 44 which electrically couples all the electrical components. An example of the control board 44 may be a circuit board, or a collection of independent wires extending between components. For example, the control board 44 may electrically couple the sensor 20, the lighting element 18, the on/off switch 26, the mode switch 28, and an electrical source 42. The electrical source 42 may be any component capable of supplying electrical power for the electrical components. Examples of the electrical source 42 may include batteries or an electrical cable. The control board 44 may also include an indicator light 64 electrically coupled to the control board 44. The indicator light 64 may be used to indicate whether the acoustic resonance device 10 is electrically powered or may be used to indicate the present mode the acoustic resonance device 10.

The sensor 20 may be any component which is capable of controlling the operation of the lighting element 18. Examples of the sensor 20 may include a motion detector, an accelerometer, a piezoelectric vibration sensor, or an acoustic sensor. As illustrated, when the sensor 20 is an accelerometer or a motion detector, the sensor 20 may be positioned within the control module 24. In such an embodiment, when the body 12 is moved or shaken, the sensor 20 may activate, controlling the lighting element 18 to illuminate the chamber 22. Additionally, vibrations emanating from movement of the vibration element 14 may also vibrate the body 12, causing the sensor 20 to activate.

In some embodiments, the sensor 20 may be an acoustic sensor such as a microphone. In such embodiments, responsive to the amplitude (e.g. loudness) of the sound waves within the chamber 22, the sensor 20 may activate, controlling the lighting element to illuminate the chamber 22, creating a closely-linked visual and auditory experiences.

Figure 4:
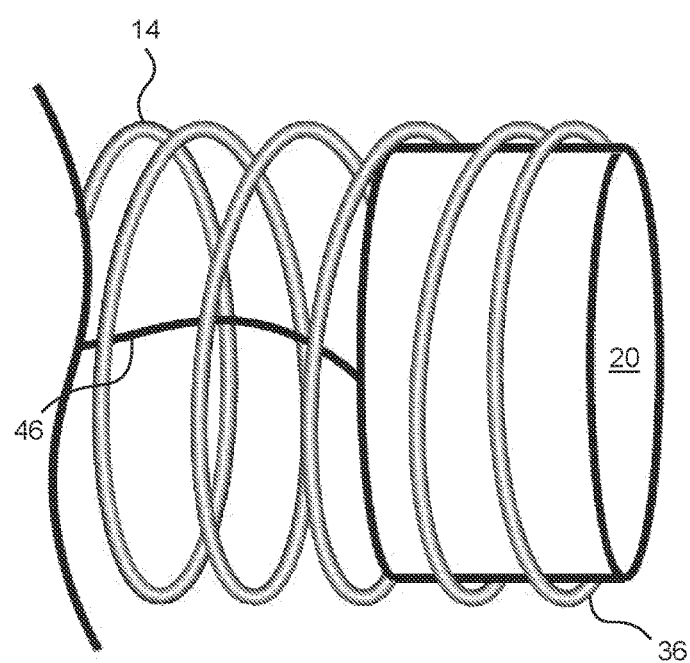
FIG. 4 illustrates a side plan view of an example of a vibration element for an acoustic resonance device including a spring and a sensor.

FIG. 4 illustrates a side view of an example of the vibration element 14 including the sensor 20. As illustrated, in some embodiments, the sensor 20 may be an accelerometer or a motion detector positioned proximate to the second end 36 of the vibration element 14. The sensor 20 may be coupled to the vibration element 14 such that movement of the vibration element 14 may send a vibration to the tympanic cover 16 and may activate the sensor 20, creating a closely-linked visual and auditory experiences. The sensor 20 may be electrically coupled to the lighting element 18 through a wire 46 extending through the vibration element 14.

Figure 5:
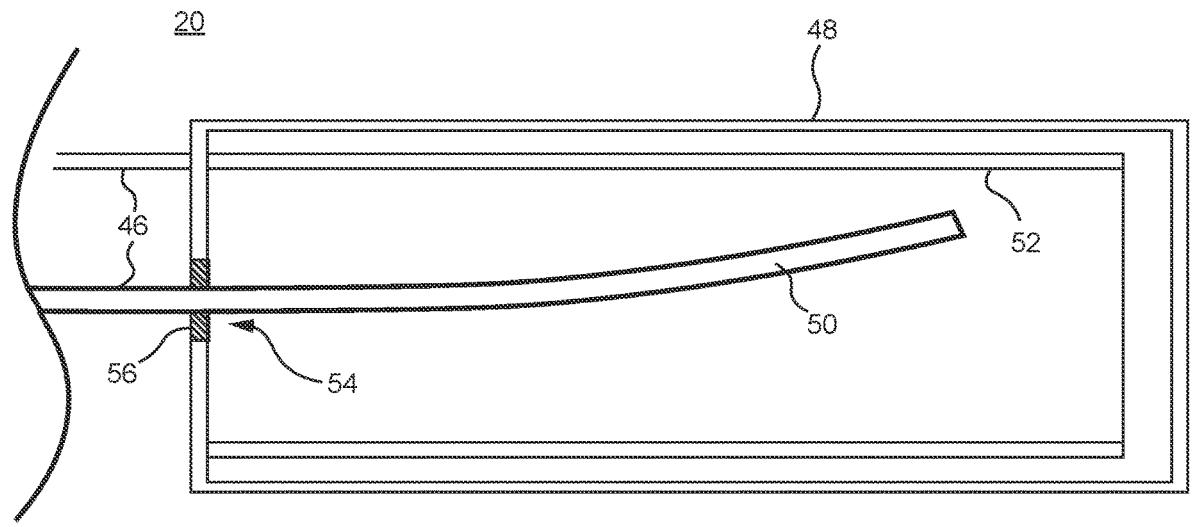
FIG. 5 illustrates a side cross-sectional view of an example of a sensor.

FIG. 5 illustrates a side cross-sectional view of an example of the sensor 20. In some embodiments, particularly when the sensor 20 is a motion detector, the sensor 20 may include a shell 48, a flexible first electrical contact 50 inside the shell 48, and a second electrical contact 52 inside the shell 48. The shell 48 may be any component which at least partially encloses the flexible first electrical contact 50 and the second electrical contact 52. Examples of the shell 48 may include a box, a cylinder, or a spherical shell. The shell 48 may be made of an electrically insulating material such as rubber to prevent unintentional activation of the flexible first electrical contact 48 or the second electrical contact 50. The flexible first electrical contact 50 may be any component which is electrically conductive and extends into the shell 48. Examples of the flexible first electrical contact 50 may include a spring, a filament, or a wire. The flexible first electrical contact 50 be made from a variety of electrically conductive materials such as aluminum, steel, iron, or copper. The second electrical contact 52 may be any component which is electrically conductive with the flexible first electrical contact 50. The second electrical contact 52 be made from a variety of electrically conductive materials such as aluminum, steel, iron, or copper. Examples of the second electrical contact may include a cylinder, a coiled spring, the inner surface of the shell 48, or the entire shell 48.

As illustrated in FIG. 5, the flexible first electrical contact 50 may extend into the shell 48 through an opening 54 in the shell 48. Each of the flexible first electrical contact 50 and the second electrical contact 52 may be coupled to a wire 46, such that when the flexible first electrical contact 50 touches the second electrical contact 52, electrical current may flow, for example, from a first wire 46, to the flexible first electrical contact 50, to the second electrical contact 52, and into a second wire 46. To prevent unintended electrical transmission, the opening 54 of the shell 48 may include an insulating material 56 to electrically separate the shell 48 and the flexible first electrical contact 50.

When the sensor 20 is shaken, the flexible first electrical contact 50 may touch the second electrical contact 52, completing an electrical circuit. When the electrical circuit is completed, the sensor may be activated, causing the lighting element 18 to illuminate the chamber 22.

Figure 6:
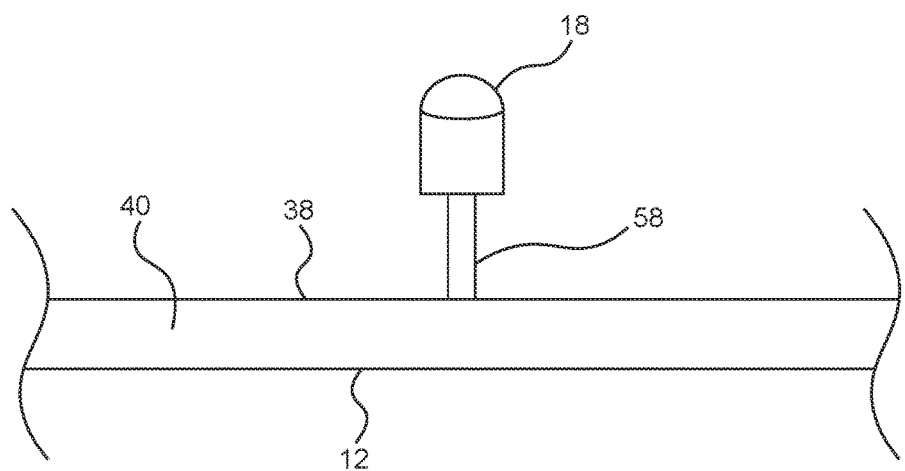
FIG. 6 illustrates a side cross-sectional view of an example of a cylindrical body including a lighting element and a flexible pylon.

FIG. 6 illustrates a cross-sectional side view of an example of the body 12 including the lighting element 18. In some embodiments, the lighting element 18 may be coupled to the inner surface 38 of the body 12, positioned to the project light into the chamber 22. In other embodiments, the lighting element 18 may be suspended within the chamber 22 by an elongated member 58 extending inward from the inner surface 38 of the body 12. The elongated member 58 may be flexible to allow the lighting element 18 to move or wobble as the body 12 is shaken, causing a dynamic lighting effect within the chamber 22.

The elongated member 58 may be any component which is capable of suspending the lighting element 18 within the chamber 22. Examples of the elongated member 58 may include a spring or a flexible pylon. The elongated member 58 may be sufficiently rigid to maintain the position of the lighting element 18 within the chamber 22 when the body 12 is not being moved or shaken.

Figure 7:
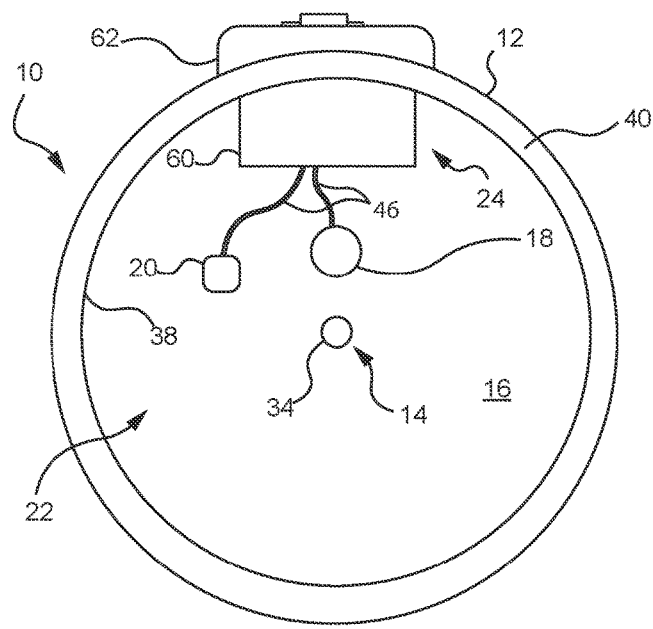
FIG. 7 illustrates front plan view of a third example of the acoustic resonance device including a cylindrical body, a hollow chamber, a sensor, and a lighting element.

FIG. 7 illustrates a front plan view of an example of the acoustic resonance device 10. As illustrated, in some embodiments, the sensor 20 may be positioned on the tympanic cover 16 to better detect vibrations emanating across the tympanic cover 16. In such an embodiment, the sensor 20 may be electrically coupled to the other components within the control module 24 through wires 46.

In some embodiments, the lighting element 18 may be positioned within chamber 22 of the body 12, proximate to either the first end 30 or the second end 32 of the body. For example, if the lighting element 18 is positioned near the first end 30 of the body 12, the lighting element 18 may be directed to illuminate toward the second end 32 of the body 12, maximizing the illumination of the body 12 and the tympanic cover 16. In other examples, if the lighting element 18 is positioned near the second end 32 of the body 12, the lighting element 18 may be directed to illuminate toward the first end of the body 12, maximizing the illumination of the body 12 and projecting light out from the uncovered first end 30 of the body 12. In such embodiments, the lighting element 18 may be held in place using the elongated member 58 and electrically coupled to the other components within the control module 2 through wires 46.

Figure 8:
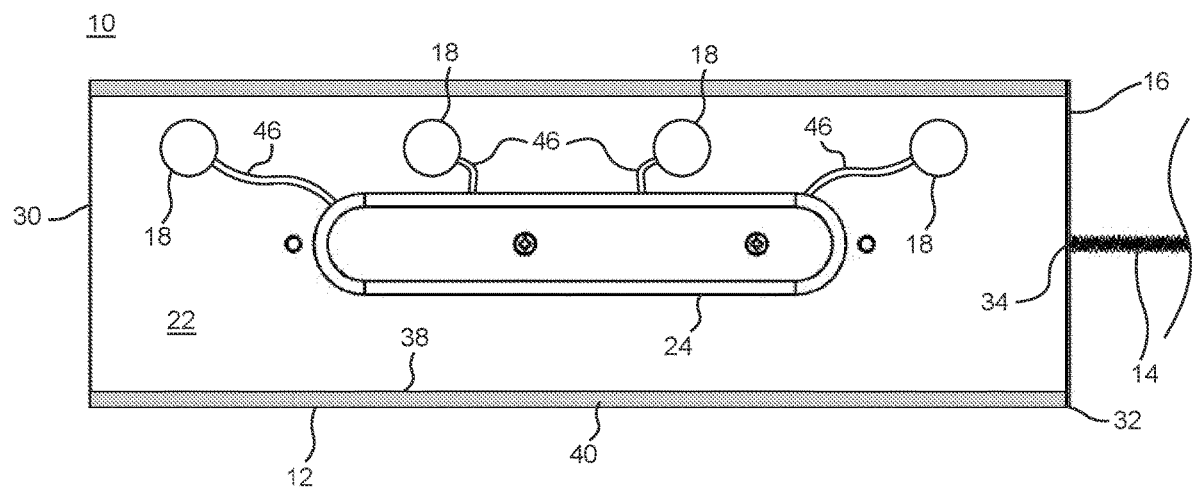
FIG. 8 illustrates a side cross-sectional view of a fourth example of the acoustic resonance device including a cylindrical body, a hollow chamber, a vibration element, and a plurality of lighting elements.

FIG. 8 illustrates a cross-sectional bottom view of another example of the acoustic resonance device 10. In some embodiments, multiple lighting elements 18 may be positioned in an array along the length of the inner surface 38 of the body 12 extending from the first end 30 to the second end 32. Each of the lighting elements 18 may be electrically coupled to the control board 44 through wires 46. In such an embodiment, the control board 44 may be configured to time activation of each of the lighting elements 18 in the array to create a lighting effect responsive to activation of the sensor 20. For example, activation of the sensor 20 may cause the control board 44 to sequentially activate the array of lighting elements 18 to simulate a visual effect similar to lightning.

Figure 9:
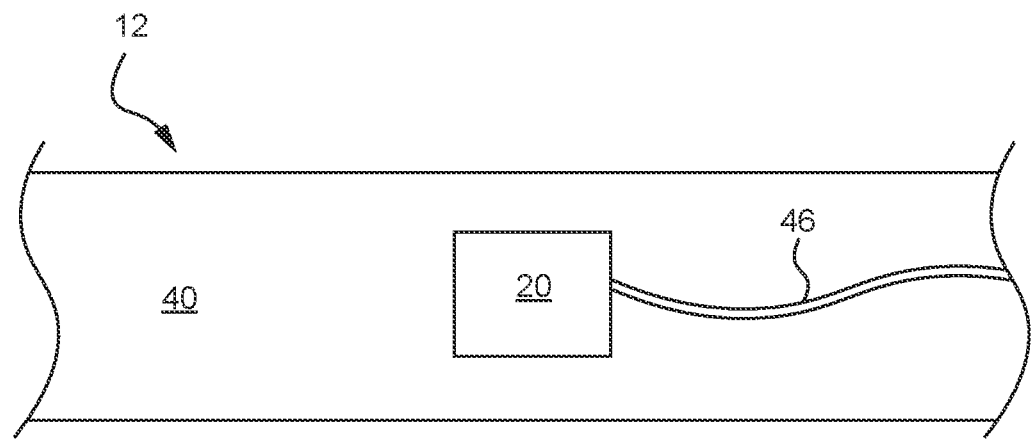
FIG. 9 illustrates a cross-sectional side view of a wall of a cylindrical body including a sensor.

FIG. 9 illustrates a cross-sectional side view of an example of the body 12. In some embodiments, the sensor 20 may be embedded within the wall 40 of the body 12 to detect vibrations within the wall 40 of the body 12. For example, if the sensor 20 is a piezoelectric vibration detector, a first portion of the sensor 20 may be coupled to a first portion of the wall 40 and a second portion of the sensor 20 may be coupled to a second portion of the wall. 40. Vibrations passing through the wall may create differential movements between the first portion and the second portion of the wall, cause the sensor 20 contract or expand. Such expansion or contraction may activate the sensor 20.

Figure 10:
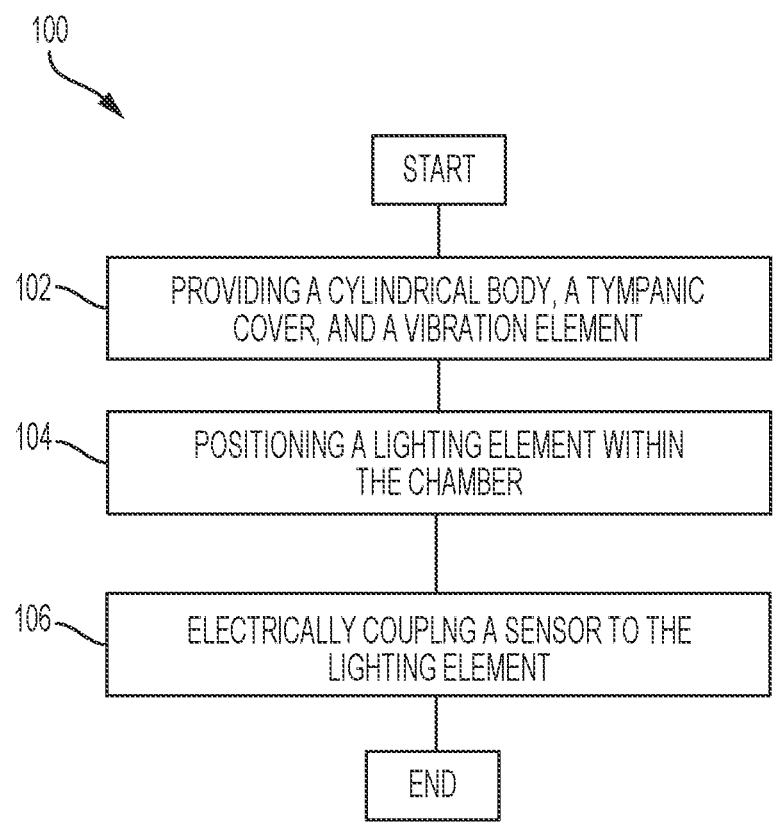
FIG. 10 illustrates a flow diagram of example operations to perform as part of a method of manufacturing an acoustic resonance device.

FIG. 10 illustrates a method of manufacturing the acoustic resonance device 10, initially providing the cylindrical body 12, the tympanic cover 16, and the vibration element 14 (102). The cylindrical body 12 may include the inner surface 38 defining the chamber 22. The method further includes positioning the lighting element 18 within the chamber 22

(104), and electrically coupling the sensor 20 to the lighting element 18 (106). The sensor 20 may be adapted to control the lighting element 18.

In some embodiments the sensor 20 may be adapted to control an intensity of illumination of the lighting element 18. For example, the intensity of the illumination of the lighting element 18 may be proportional to a strength or intensity of a signal detected by the sensor 20. The strength of the signal detected by the sensor 20 may be calibrated to many possible measurements including (a) acceleration of body 12 or the vibration element 14, (b) movement of the body 12, tympanic cover 16, or vibration element 14, (c) vibrations within the wall of the body 12, within the tympanic cover 16, or within the vibration element 14, or (d) the amplitude (e.g. loudness) of the soundwaves within the chamber of the body 12.

Furthermore, although specific components are described above, methods, systems, and articles of manufacture described herein may include additional, fewer, or different components. For example, in some embodiments, the mode switch 28 and on/off switch 26 may not be present, or in some embodiments, multiple lighting elements 18 may be present.

In addition to the advantages that have been described, it is possible that there are other advantages that are not currently recognized. However, these advantages which may become apparent at a later time. While various embodiments have been described, it will be apparent to those of ordinary skill in the art that many more embodiments and implementations are possible. Accordingly, the embodiments described herein are examples, not the only possible embodiments and implementations.

We claim:

1. An acoustic resonance device, comprising:
   a cylindrical body comprising an inner surface and defining a chamber extending from a first end to a second end of the cylindrical body, wherein the first end is uncovered;
   a tympanic cover coupled to the second end of the cylindrical body;
   a vibration element comprising a first end and a second end, wherein the first end is coupled to the tympanic cover;
   a lighting element arranged within the chamber of the cylindrical body; and
   a sensor electrically coupled to the lighting element and configured to control the lighting element.

2. The acoustic resonance device of claim 1, wherein the sensor comprises an accelerometer.

3. The acoustic resonance device of claim 2, wherein the sensor is positioned proximate to the second end of the vibration element.

4. The acoustic resonance device of claim 1, wherein the sensor comprises a flexible first electrical contact and a second electrical contact arranged within a shell, wherein the second electrical contact at least partially surrounds the first flexible electrical contact such that when the flexible first electrical contact touches the second electrical contact, the sensor is activated.

5. The acoustic resonance device of claim 4, wherein the sensor is positioned within a control module coupled to the cylindrical body.

6. The acoustic resonance device of claim 5, wherein the lighting element is coupled to the inner surface of the cylindrical body.

7. The acoustic resonance device of claim 6, wherein the lighting element is suspended within the chamber of the cylindrical body by an elongated member extending inward from the inner surface of the cylindrical body, and the elongated member is flexible to allow movement of the lighting element within the chamber.

8. The acoustic resonance device of claim 1, wherein the sensor comprises an acoustic sensor positioned within the chamber of the cylindrical body.

9. The acoustic resonance device of claim 1, wherein the sensor is coupled to the tympanic cover.

10. The acoustic resonance device of claim 9, wherein the lighting element is positioned proximate the first end of the cylindrical body and directed to illuminate the second end of the cylindrical body.

11. An acoustic resonance device, comprising:
    a cylindrical body comprising an inner surface defining a chamber extending from a first end to a second end of the cylindrical body, wherein the first end is uncovered;
    a tympanic cover coupled to the second end of the cylindrical body;
    a spring coupled to the tympanic cover;
    a light-emitting diode coupled to the inner surface of the cylindrical body; and
    a sensor electrically coupled to the lighting element and configured to control the light-emitting diode.

12. The acoustic resonance device of claim 11, comprising an array of light-emitting diodes coupled to the inner surface of the cylindrical body and arranged along a length of the cylindrical body from the first end and to the second end.

13. The acoustic resonance device of claim 12, further comprising a control board electrically coupled to the array of light-emitting diodes and the sensor, wherein the control board is configured to time activation of each of the light-emitting diodes in the array to create a lighting effect responsive to activation of the sensor.

14. The acoustic resonance device of claim 11, wherein the sensor is lighting element is configured to activate proportionally to an intensity detected by the sensor.

15. The acoustic resonance device of claim 11, wherein the sensor comprises a piezoelectric vibration sensor embedded within a wall of the cylindrical body.

16. The acoustic resonance device of claim 11, wherein at least a portion of the body is translucent.

17. A method of manufacturing an acoustic resonance device, comprising:
    providing a cylindrical body, a tympanic cover, and a vibration element, wherein the cylindrical body comprises an inner surface defining a chamber extending from a first end to a second end of the cylindrical body, the first end of the cylindrical body is uncovered, the tympanic cover is coupled to the second end of the cylindrical body, the vibration element comprises a first end and a second end, and the first end of the vibration element is coupled to the tympanic cover;
    positioning a lighting element within the chamber; and
    electrically coupling a sensor to the lighting element, wherein the sensor is configured to control the lighting element.

18. The method of claim 17, wherein the sensor is configured to control an intensity of illumination of the lighting element proportionally to a strength of a signal detected by the sensor.

19. The method of claim 18, further comprising calibrating the sensor such that the strength of the signal is proportional to an amplitude of sound waves within the chamber of the cylindrical body.

20. The method of claim 17, wherein the sensor is configured to sequentially activate an array of lighting elements arrayed along a length of the cylindrical body from the second end to the first end.

* * * * *